United States Patent [19]

Bergholm et al.

[11] Patent Number: 5,761,432

[45] Date of Patent: Jun. 2, 1998

[54] METHOD AND APPARATUS FOR PROVIDING AN EFFICIENT USE OF TELECOMMUNICATION NETWORK RESOURCES

[75] Inventors: Joseph O. Bergholm, Holmdel; John Michael Davis, Red Bank; Shui Yee Lee, Holmdel; Behzad Nadji, Little Silver; Peter Di-Hsian Ting, Holmdel, all of N.J.

[73] Assignee: AT&T Corp., Middletown, N.J.

[21] Appl. No.: 680,943

[22] Filed: Jul. 15, 1996

[51] Int. Cl.⁶ ............................................. H04L 12/28

[52] U.S. Cl. ....................... 395/200.56; 395/200.59; 705/28

[58] Field of Search ................ 395/200.03, 200.56, 395/200.59; 364/478.04, 478.09, 479.06, 479.07; 705/28

[56] References Cited

U.S. PATENT DOCUMENTS

| | | | |
|---|---|---|---|
| 5,311,424 | 5/1994 | Mukherjee et al. | 364/401 |
| 5,570,291 | 10/1996 | Dudle et al. | 364/468.01 |
| 5,592,560 | 1/1997 | Deaton et al. | 382/100 |

Primary Examiner—Emanuel Todd Voeltz
Assistant Examiner—Thomas Peeso

[57] ABSTRACT

An attribute design database system provides for inventory management, order process management and design management. The system operates in a telecommunications management network provisioning environment. It provides a physical network management system that includes various telecommunications network management tools. Graphical user interface facilitates the user's navigation of the database system to enable the same person to have access to and the ability to modify information in regards to inventory management, design management and order management for the network.

22 Claims, 26 Drawing Sheets

FIG. 10

```
VIEW/UPDATEOFFICE PROPERTIES (IM)
───── OFFICE IDENTIFICATION ─────
OFFICE ID:  OFFICE                    OWNER SUBNETWORK ID: BAKBN
OFFICE TYPE: [CENTRAL OFFICE]         CUSTOMER NAME:

───── OFFICE COORDINATES ─────
COORDINATE TYPE: [LATITUDE/LONGITUDE]  COORDINATE 1: [    ]   COORDINATE 2: [    ]

───── OFFICE ADDRESS ─────
STREET NAME:     [         ]          CITY:         [         ]
STREET NUMBER:   [         ]          STATE:        [  ]
FRACTIONAL NUMBER:[        ]          ZIP CODE:     [      ]
STREET SUFFIX:   [  ]                 COUNTRY:      [         ]
STREET PREFIX:   [  ]                 PARCEL NUMBER:[         ]
ADDITIONAL INFORMATION: [                              ]

───── CUSTOM INFORMATION ─────
CUSTOM FIELD 1:                       CUSTOM FIELD 2:

CUSTOM FIELD 3:                       CUSTOM NUMBER:

NOTES: [                                              ]

[ OK ]   [ APPLY ]   [ RESET ]   [ CANCEL ]   [ HELP ]
```

*FIG. 12*

| | Browse/Update Equipment (IM) | |
|---|---|---|
| File  Query  Edit  View  Ports | | Help |

Query Criteria

Subnetwork ID: BAKBN     Office ID" ICELAND     Equipment ID:

Equipment
- ◇ Equipment Complex
- ◇ Plug-in

Equipment Complex Type:
- ALL
- ALL_PBX_C
- AXE10_1c
- CA_SPLIT_2_1_1c
- CA_SPLIT_3_1_1C Plug-In Equipment Availablility: N/A

Equipment Data

| Equipment Type | Equipment ID | Equipment Qualified ID | Serial Number | Equipment Status | Status Date | TID | AID | Equip. Loc. | Plug-In Type | Plug-In ID |
|---|---|---|---|---|---|---|---|---|---|---|
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |

No. of Rows: 2    No. of Columns: 21    Current Working Row: 2    Command Status: Update

*FIG. 13*

| File Query Edit View | | | | | | | | | Help |
|---|---|---|---|---|---|---|---|---|---|

── Query Criteria ──

Subnetwork ID: BAKBN

Office ID: OFFICE1

Equipment
Status ID:

── Calling Info ──
◇ Carrier & External Cabling Link
◇ Internal Calbing Link
◇ Internal Link
◇ Aggregate Link Equipment
Complex Type:     AXE10_1c Equipment Type:   CA_SPLIT_2_1_1c Equipment ID     Office-AKE10_1c ── Equipment Data ──

| Port Profile Name | Port Name | Port Status | Status Date | Port Subnetwork Name | Link Name | Link Service Type | Link Dir. Trans. | Link Message | Com to Equ Office ID |
|---|---|---|---|---|---|---|---|---|---|
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |

No. of Rows: 0   No. of Columns: 13   Current Working Row:      Command Status:

FIG. 14

| | Equipment Location Type | Equipment Location Name | Equipment Type | Equipment ID |
|---|---|---|---|---|
| 1 | Room | 1 | | |
| 2 | Room | 2 | | |
| 3 | Room | 3 | | |
| 4 | Room | 4 | | |
| 5 | Room | 5 | | |
| 6 | Room | 6 | | |

Query Criteria

Office ID: OFFICE1    Subnetwork ID: BAKBN

Equipment Location Type:    Equipment Location Name:

Equipment Location Data

No. of Rows: 6    No. of Columns: 4    Current Working Row: 1    Command Status: update File Query Edit View    Help

FIG. 16

| File Query Edit View | | | | Help |

Query Criteria

Service Type: 2M, 2NT, 2CNT, 3NC7

Trunk Query

Termination Office ID
- Term A: OFFICE1
- Term Z: OFFICE2

Frame ID
- Term A:
- Term Z:

Equipment Type
- Term A:
- Term Z:

Link Data

*Service Based Attributes*

- Line Format:
- Frame Format:
- Link Usage:
- Signaling Type:
- Urgency of Restoration:
- Transmission Medium:
- Composition of Transmission:
- Performance Monitoring:
- Echo Suppression:

*Service Information*

- Pending State Date: MM/DD/YY
- Link Status: E
- Occupancy Status: S
- Restriction Status: N Customer Name:
Supplier Link Name:
Project ID:

*FIG. 20*

ENTER SERVICE ORDER DATA (DM)

Project ID:  
Installation Time: [        ]  
(HH:MM:SS)  
Service Starting Time:  
Service Ending Time:  
Restoration Link ID:  
Direction of Transmission: [B▢]  
Supplier Link ID: [                    ]

Change Code:  
Primary Office: [        ▽]  
Alternate Office A: [        ▽]  
Alternate Office B: [        ▽]

Restoration Priority: [1▢]

Trunk Group Information
Trunk Group ID: [                    ]  
Circuit Identifier Code: [                    ]

Customer Information
Customer Name:  
Customer Address:

Requistioner Information
Name: [                    ]   Phone: [        ]  
Address: [                    ]

Order Administrator Information
Name: TEST LAB   Phone: 525-222-6120  
Address: 1234 MAIN ST, USA Design Remarks: [                    ]  
Administration Remarks: [                    ]

[ OK ] [ APPLY ] [ DEFINE CHANNELS ] [ RESET ] [ CANCEL ] [ HELP ]

FIG. 21

| ENTER SERVICE ORDER DATA (DM) |

Termination(Term.)ID: TERMINATION-A        Term. Action Code:   NEW CONNECT
Serving Office ID: [      ▽]                Central Office ID: [     ▽]
Facility ID: [       ]                       Equipment ID: [      ]
Customer Office ID: [       ]                Customer Contact Phone: [      ]
Customer Address: [                                            ]
Customer Contact Name: [                                       ]

──── Transmission Levels ────
               .0                                       .0
-13.0   Termination Level IN    +13.0    -13.0   Termination Level OUT   +13.0
               .0                                       .0
-13.0   Serving Office Level IN +13.0    -13.0   Serving Office Level OUT +13.0

──── Characteristics ────
Number of Wires: [N/A□]      Signaling: [ * □]         Impedance: [N/A□]
Modulation: [N/A□]           Line Format: [ * □]       Frame Format: [ * □]
Jack Type: [N/A□]            Equipment Type: [ * □]    Sealing Current: [N/A□]

Design Remarks: [                               ]
Administration Remarks: [                        ]

[ OK ]   [ APPLY ]   [ RESET ]   [ CANCEL ]   [ HELP ]

FIG. 22

UPDATE ORDER ACTIVITIES (DM)

Order Information

Order ID: 13502   Version.No: 1   Due Date: 01/01/97
Project ID:   Expedite Authority: 1

Activity Information

| | Activity Type | User ID | Objective Date | Actual Date | Manual Jeoprdy | System Jeopardy | Activeity Details |
|---|---|---|---|---|---|---|---|
| 1 | Order Iniation | CUST02 | 02/27/96 | 02/27/1997 | | N | No Dependent Orders |
| 2 | User Assignment | CUST02 | | | | N | No Dependent Orders |
| 3 | Order Complete | | | | | N | No Dependent Orders |
| 4 | Design Link | | | | | N | No Dependent Orders |
| 5 | Create WORD | | | | | N | No Dependent Orders |
| 6 | Installation | | | | | N | No Dependent Orders |
| 7 | In Service | | | | | N | No Dependent Orders |
| 8 | | | | | | | |
| 9 | | | | | | | |
| 10 | | | | | | | |

[ Complete ]   [ Re-assign.. ]   [ Activity Details.. ]   [ Notes.. ]

[ OK ]   [ APPLY ]   [ RESET ]   [ CANCEL ]   [ HELP ]

Message: Click Menu Button in Activity Table to Copy or Paste Table Entry

FIG. 23

| UPDATE ORDER ACTIVITIES (DM) | | | | | |
|---|---|---|---|---|---|

Query Criteria

Service Type: All
Activity Type: All
User ID: CUST01
Customer Name:
Project ID:
Trunk Group ID:
Due Date:
(DD/MM/YY)
☐ In Jeopardy User Group
◇ Not Applicable    ◇ User Group
User Group ID: USERGROUP2

Order Status
☐ Canceled
☐ In Service

Order Action
◇ New Connect  ◇ Engineering
◇ Disconnect   ◇ Records
◇ Change       ◇ All Service Order Data

| Order ID: | Link ID: | Ver No: | Order Status | Activity Type: | Due Date: |
|---|---|---|---|---|---|
| 123414 | | | Active | User Assignment | 02/27/1997 |
| | | | | | |
| | | | | | |
| | | | | | |
| | | | | | |
| | | | | | |

Click a column label to sort

Open Order          Cancel Order

OK    APPLY    RESET    CANCEL    HELP

FIG. 24

Termination (Term) A and Z Data

Service Type: E1

Office ID:
Term A: OFFICE1
Term Z: OFFICE2

Frame ID:
Term A:
Term Z:

Equipment Type:
Term A:
Term Z:

Link Data

Service Based Attributes

Requested Bandwidth: 2.0480    Link Query Bandwidth: 2.0480

- Line Format:
- Frame Format:
- Link Usage:
- Signaling Type:
- Urgency of Restoration:
- Transmission Medium:
- Composition of Trans.:
- Performance Monitoring:
- Echo Suppression:
- Status Info

Status Information

- Link Status: S
- Occupancy Status: N
- Restriction Status: E

Project ID:     Customer Name:

Supplier Link Name:

[ Assign ] [ Auto ] [ Zoom In ] [ Zoom Out ] [ Reset ] [ Cancel ]

METHOD AND APPARATUS FOR PROVIDING AN EFFICIENT USE OF TELECOMMUNICATION NETWORK RESOURCES

BACKGROUND OF THE INVENTION

The present invention is directed to a method and an apparatus for providing more efficient use of telecommunications network resources. In particular, the present invention provides an attribute designed database system which provides for inventory management, order process management and design management together.

The complexity of designing, building, and maintaining networks is well known. Telecommunications networks can be created from various pieces of equipment. This equipment can be located in various control points referred to as offices. Each office can contain its own inventory of equipment. Thus, there is a need to monitor or control the inventory in the various office locations throughout the network. In addition, there is a need to design links between offices in the network so as to provide different services throughout the network. Finally, there is also a need to provide orders for service adaptations, either service enhancements in the network or the removal or replacement of services.

Each of these three categories of information, i.e., inventory, design and order management have been treated separately in the past. Different databases have been constructed to separately monitor inventory or permit the design of links or provide for the creation or editing of orders. However, the distribution of all of this information over multiple databases creates an additional layer of complexity in the control and planning and maintaining of the overall network. Each different database stores information peculiar to that database as well as information which may be of benefit in a number of the other databases. Therefore, there is some overlap or redundancy when the databases are considered as a whole. However, the format of the stored data may vary from database to database thereby severely limiting the ability to exchange appropriate information. In addition, different people will have access to different information within different databases. It might be necessary for the same person to have access to two or more of the databases to complete their job functions. Under the present existing structures for monitoring and controlling inventory, design and service orders there is inefficient coordination of these efforts and there is no database provided which promotes the efficient use of the telecommunications networks by considering the related nature of these three general categories of information.

SUMMARY OF THE INVENTION

The present invention provides an improvement by tying inventory management, order management and design management all together in connection with an attribute design database system. A network database system of this type, together with a graphical user interface, apprise network builders of the specific equipment available at each desired network linking site thereby providing inventory information. The database also provides for easy access to order information so that orders can be created and modified and orders in progress can be monitored. Additionally, the database provides the capability of performing the design function such as designing links to implement orders that have been created or supplemented.

In accordance with the present invention user groups can be defined. Each user is assigned to one or more user groups. Each user group has a permitted range of functionality, e.g. browsing inventory information, browsing and updating network design information. Also, the present invention provides a sophisticated graphical user interface which facilitates the user's access to the various features of the attribute design database system.

The present invention can be implemented in any one of at least three configurations. In one configuration the attribute design related database ("the database ") is part of a user's local area network (LAN). Alternatively, a user in a different LAN can access a central server at which the database resides via a wide area network (WAN). Finally, a central server, can be coupled to users from a number of different LANS that are largely independent; but connected to the central server via a WAN.

BRIEF DESCRIPTION OF THE DRAWINGS

FIGS. 4 to 26 show sample graphical user interface windows usable in an embodiment of the present invention to enable a user of the present invention to navigate through the provided functionality.

DETAILED DESCRIPTION

The present invention is directed to a system which operates in a telecommunications management network (TMN) provisioning environment. In particular, the present invention provides a physical network management system that provides various telecommunications network management tools. The system is referred to as a Service Design and Inventory System(SDI).

Figure 1:
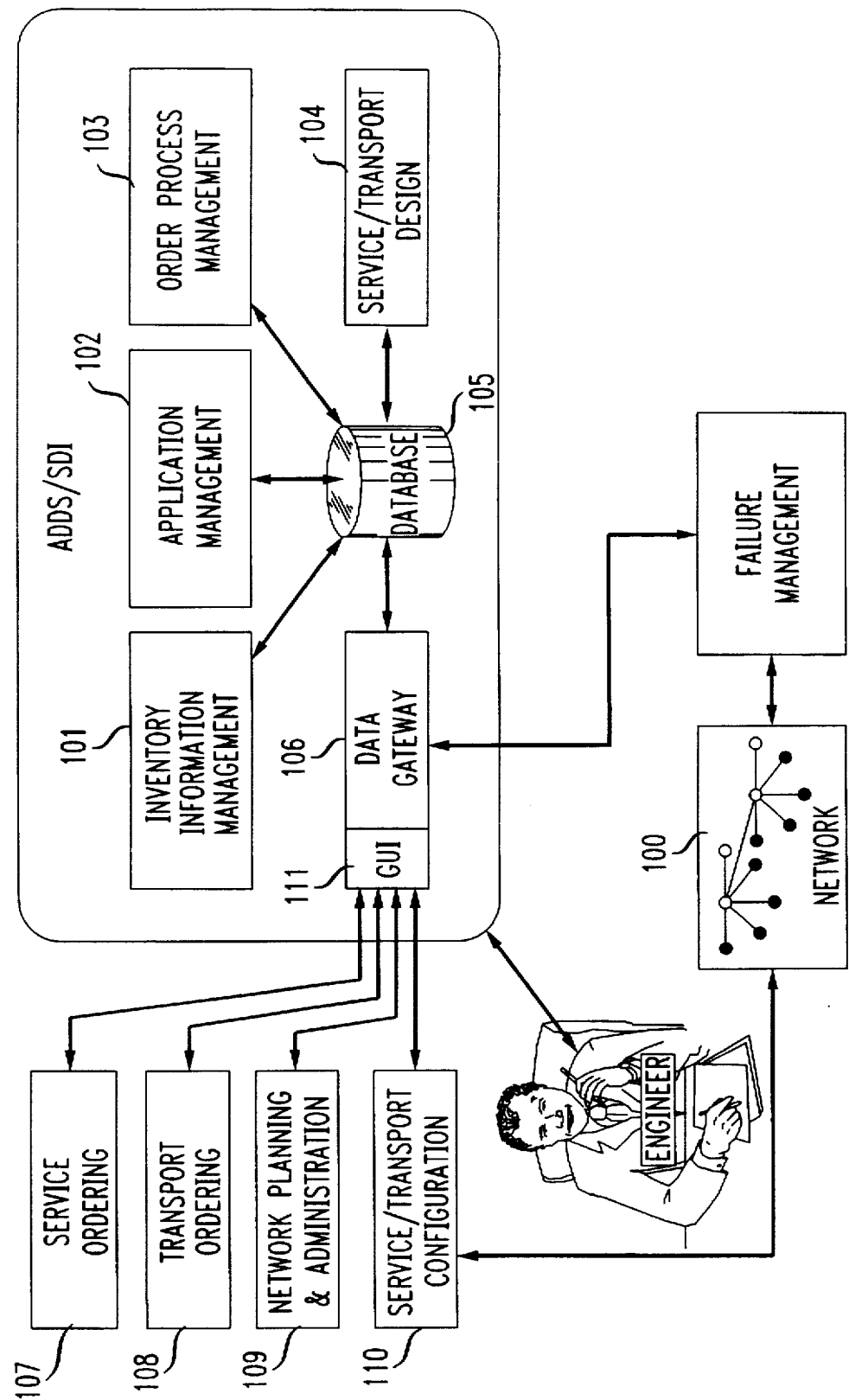
FIG. 1 is a schematic diagram illustrating an embodiment of the present invention.

FIG. 1 illustrates in block diagram form the major subsystems of SDI. The figure illustrates the basic relationship between SDI and certain functionality as it pertains to managing network 100. SDI includes inventory information management capabilities 101, application management capabilities 102, order process management capabilities 103 and service/transport design capabilities 104. All of these management and design capabilities interact with a database 105. In turn the database interacts with data gateway 106 which, via a graphical user interface (GUI) 111 interfaces to the outside world in which various requests for functionality are provided. Such functions are: service ordering 107; transport ordering 108; network planning and administration 109; and service/transport configuration 110. Each of the individual modules or components of SDI will be described generally below. Then, a more detailed description of the inventory management and design management capabilities of SDI will be described as well.

The inventory information management 101 supports additions and changes to the SDI database and enables tracking of the use and availability of network components and components status through the use of queries and reports. It also manages the physical inventory items and permits browsing and updating with respect to such items as: trunk groups; equipment data; equipment location data; link data; back-to-back routing data; project data; customer data; and office data.

The service and transport design component, also referred to as the design management component, uses different types of data, e.g., data from the database, data a user enters about an order or a customer and customer interface definition data, to create and modify a network design. The design subsystem is provided with an automated provisioning capability that, together with a graphical user interface permits the user to see the network grow as each link is created.

The order management component, 103, tracks all orders, from first contact to a moment when a link goes into service, including management of scheduling, jeopardy information, and order status. A number of order management features support the design management subsystem such as: creating, querying and listing New Connect, Change and Disconnect orders; validating order entry data; translating orders into attribute requirements for the design process; generating a schedule of activities and intervals based on service type, order action, expedite, and sub-networks; and tracking the completion of scheduled activities against objective intervals.

The application management subsystem, 102, permits customizing the SDI system through various rule and translation tables.

Figure 2:
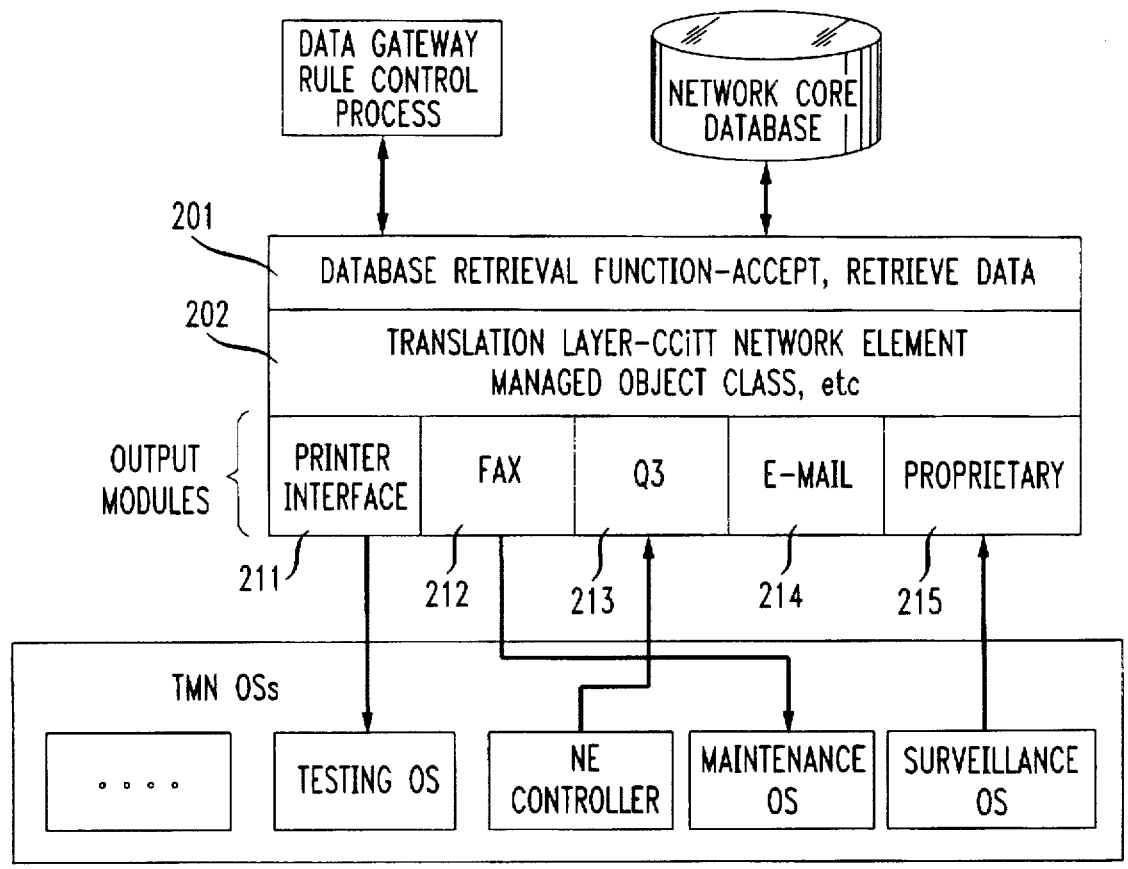
FIG. 2 illustrates in further detail the data gateway element of FIG. 1.

The SDI gateway 106 provides a flexible architecture to interface with other TMN processes and systems. An example of such a gateway is illustrated in FIG. 2. The gateway has a database retrieval function for accepting and retrieving data with respect to the network core database shown as 201 in FIG. 2 (corresponding to database 104 of FIG. 1). In addition, a translation layer (202) formats SDI data for other systems and processes. A plurality of output modules 211 to 215 transmit data in a protocol required by other systems and processes, for example, fax, Q3, CMIP, and proprietary. As a consequence of this construction, the data gateway provides flexibly designed open interfaces between the SDI network database and systems and processes in the service management level and element management as well as other network management layer systems.

Figure 3:
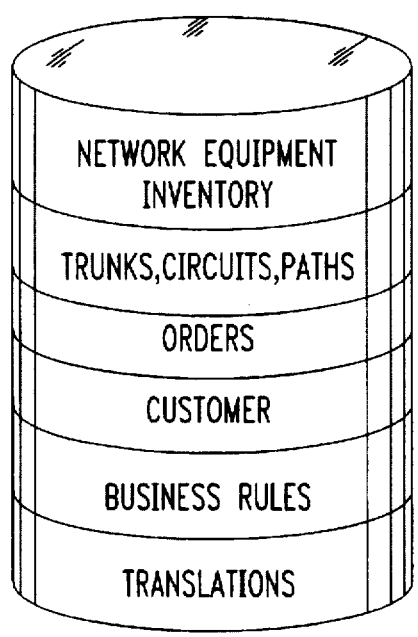
FIG. 3 illustrates in greater detail the database of FIG. 1.

The database 104 is shown in more particularity in FIG. 3. The database is a relational attribute-based database designed to support the object-oriented SDI process. The database is attribute based in that new services, such a trunks, leased lines or transmission orders, can be added simply by defining their attributes and adding a customer-defined name. SDI processes are based on attributes that are fundamental to telecommunications applications such as bandwidth, line format, frame format and signaling. The relational database structure facilitates the definition of service types in terms of their names and associated attributes. Attributes can also be used to identify equipment ownership, cost and sub-networks. Because the system is attribute based it is flexible and can be configured to meet the needs of the customers' changing telecommunications business environment with new services, new interfaces, new technologies, new organizational structures and new business processes. As is represented in FIG. 3 the database contains flexible data structures that accommodate network equipment inventory, trunks/circuits/ and paths, orders and projects, customers, business rules and translation information.

Despite the variations in local type definitions, however, all services (as requested by orders) can be viewed in terms of their requirements as to the fundamental attributes of a transmission network. These attributes, as illustrated in FIG. 2, include such properties as bandwidth, signaling, line format, and technology. In SDI, therefore, the application-specific specialization or typing information is captured separately. Then, it is instantiated to core objects prior to processing. Thus, specialization is achieved not through the development of specialized object classes but via the instantiation of specialized attribute values against core, generalized super classes.

The link object class is a good example of using modeling generalization and attributes in the formulation of object classes and objects. Links represent physical or logical connections between two network termination points or equipment ports. They can have inventories (channels) of available capacity. They can have component links at the same level of the network hierarchy (aggregate links) or at different hierarchy levels (which provides a mapping between levels). Finally, links have such attributes as bandwidth, line formats, technology, restoration, and ownership.

By specifying the appropriate attributes under the control of the SDI rules, link objects can be instantiated representing, for example, any level of the bandwidth hierarchy, any channelization scheme (such as ITU, North American, PDH, SONET, SDH), and any technology (such as fiber, radio, satellite). By appropriately specifying the attributes in the SDI rules, therefore, link objects can be constructed using the same object class code to support the design of a wide range of service types.

This is a radical departure from traditional system environments. Not only is code not reused, but multiple one-off systems are developed to deal with individual service types, bandwidth levels, or technologies.

SDI applies the same approach to other such generalized object classes as equipment, nodes, and orders. This insures a high degree of code reuse between applications. Furthermore, the rule tables can be defined by users without software development, illustrating the flexibility of the SDI software assets to accommodate changes in a user's environment. It also emphasizes the high level of control the SDI rule application management process places in the hands of a user.

Figure 4:
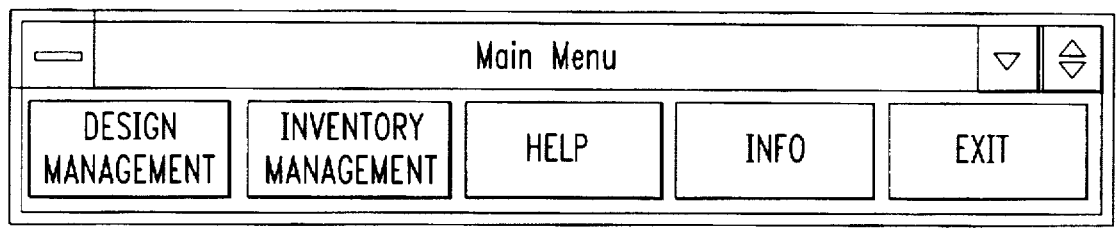

A user gains access to SDI in a log-in procedure that is based upon using an assigned user ID and password. After log in, a main menu such as that shown in FIG. 4 is provided. The two main branches from this main menu which will be discussed in detail in the specification are the design management branch and the inventory management branch accessed as menu items 41 and 42 respectively.

Note that throughout the remainder of this application numerous sample graphical user interfaces will be provided in the drawing figures as an aid to understanding the functionality achieved by implementation of the present invention. However, the format of these graphical user interfaces is simply provided as an example of how the interfaces may be organized. They should not be treated as limiting the scope of the invention, but instead are provided only for purposes of explicating the nature of the invention.

Furthermore, the next two main sections of the detailed description will refer to the inventory management capability and the design management capability respectively. As can be seen from the following description the database which supports these management capabilities is integrated so that information is easily accessible as either design or inventory related functions are being conducted.

A. Inventory Management

Figure 5:
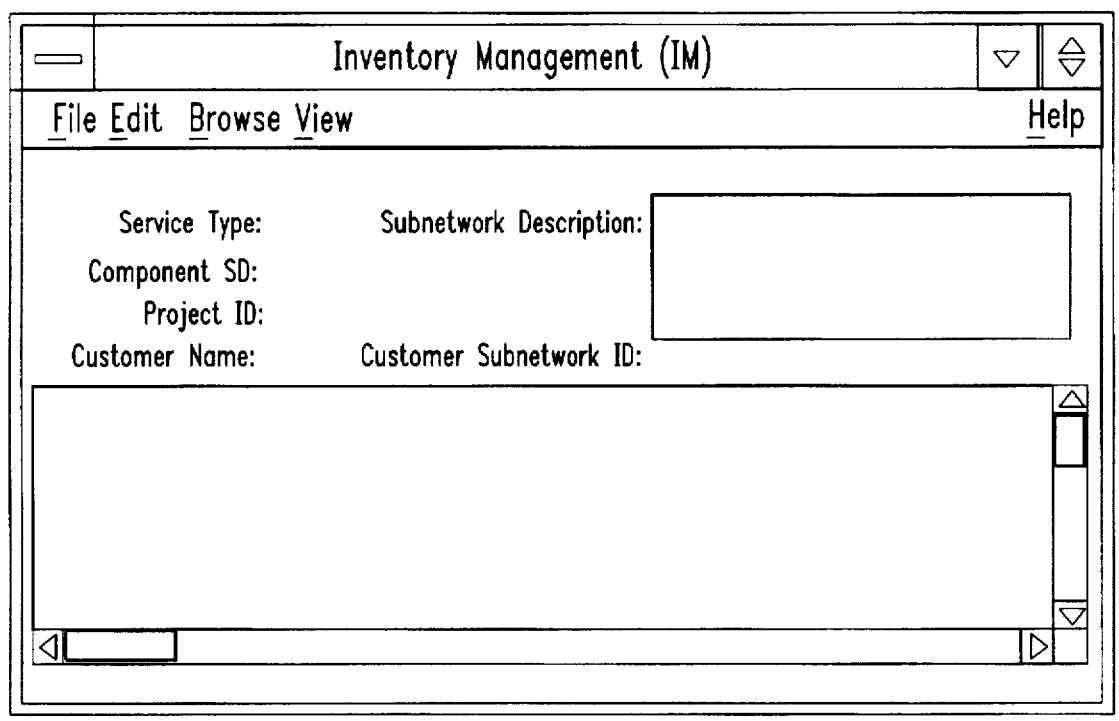

Once inventory management is selected from the main menu as shown in FIG. 4, an inventory management window can be provided to the user such as that shown in FIG. 5. The inventory management activities consist of browsing and updating the information in the SDI inventory database. As described above the inventory management subsystem provides windows for the following types of data: trunk groups data; equipment data (including port data); equipment location data; back-to-back routing data; link data; thresholds data; project data; customer data; and office data. As each window is opened an indication is provided as to whether there is a limitation to simply browse information or the capability of browsing and updating, i.e., writing to the database, is provided. Such information is related to an aspect of the present invention whereby user groups can be defined by an authority that supervises the system. The supervisor can then define some people as being allowed to do design while other people will only be allowed to do inventory browsing and still others may only be provided with the capability of doing inventory upddating.

Figure 6:
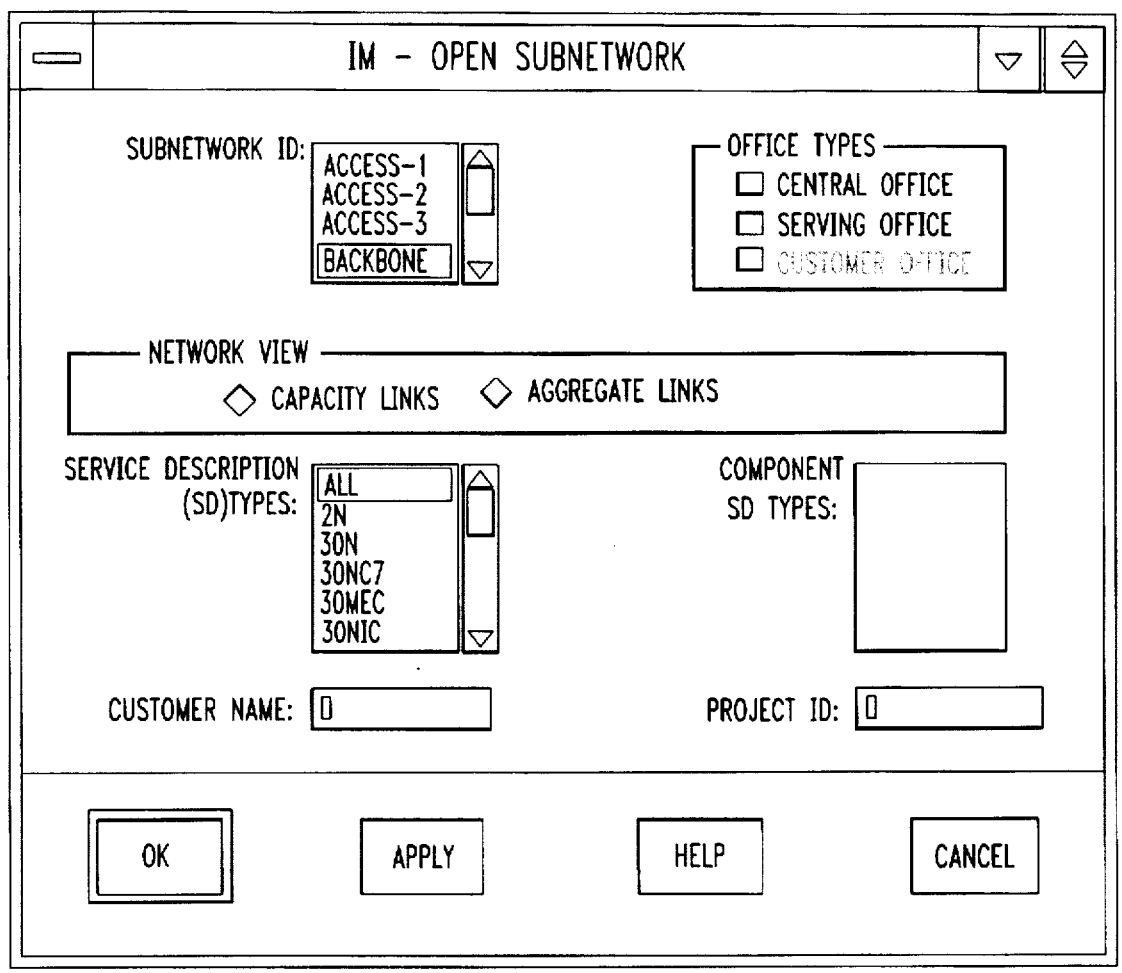

Before work can begin in the inventory management system it is necessary for the user to select a sub-network for study or operation. The definition of the sub-network partially controls the user's permissions such as browsing or updating. The sub-network can be selected in the Open Sub-Network Window such as shown in FIG. 6.

The user can select the sub-network in accordance with a sub-network ID number and can also select which type of service links are to be viewed based on the selected service description types. If the user selects the default choice, ALL, then all the links in the selected sub-network will appear in a network map which is subsequently provided. If instead of capacity links, the default selection under Network View, the user selects Aggregate Links a service type in the Service Description types option list may be selected. Once the appropriate choices have been made the user can select the OK button and the selected sub-network is loaded.

Figure 7:
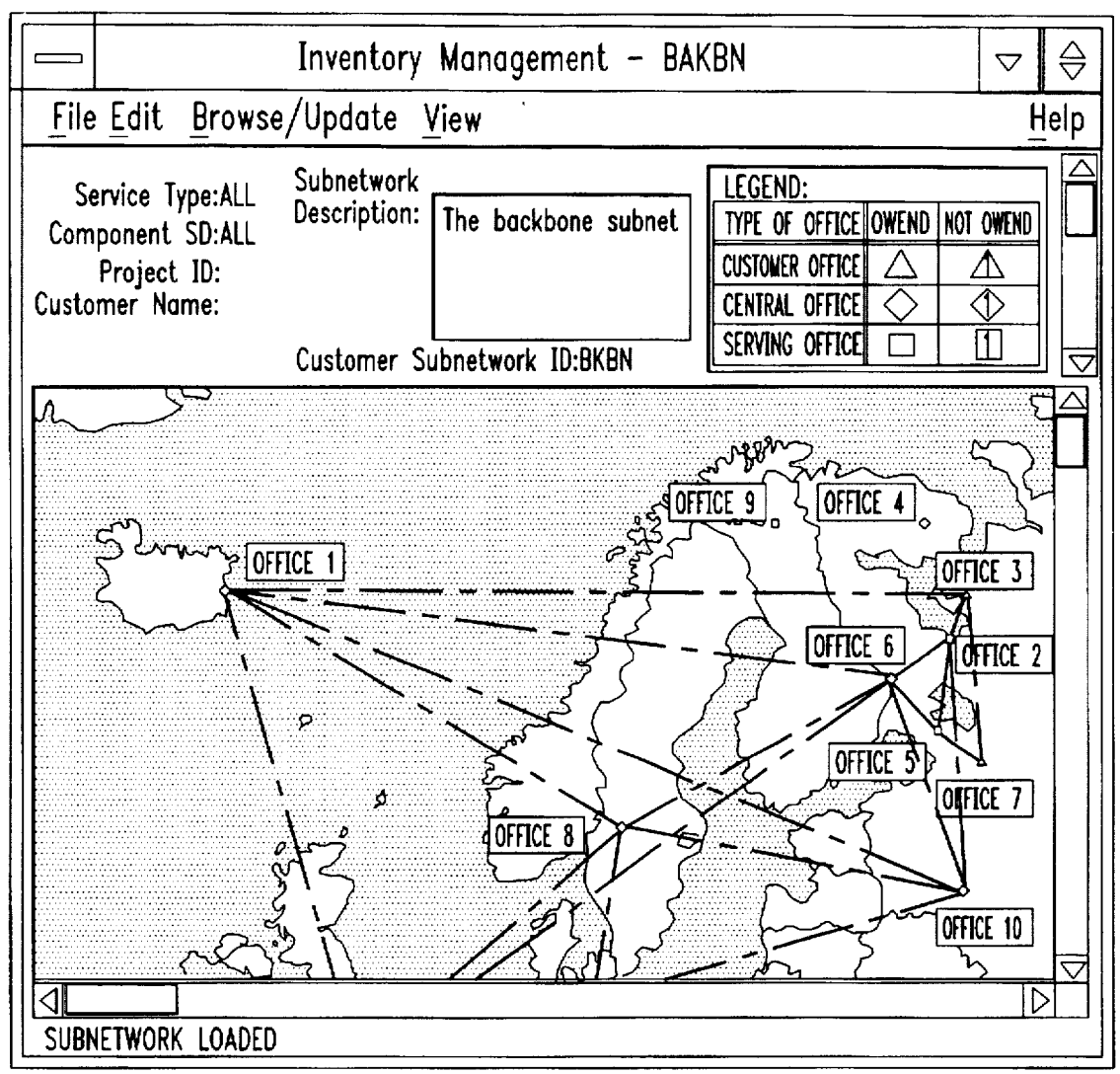

Once the sub-network is loaded, the SDI inventory management window reappears with the network map in a bottom portion of the window as shown in FIG. 7. In the illustrated embodiment the map shows various offices spread out over different geographical locations. Also, the nature of the offices is represented by certain icons on the map. Three types of offices are shown, customer offices, central offices and serving offices. Furthermore, each office is designated as either being an owned office or a leased (non-owned) office. These icons or legends are defined more clearly in FIG. 8 where it is shown that a triangular office represents a customer office, a diamond represents a central office and a square represents a serving office. If the icon is clear then the user "owns" the office in question whereas if the office is not owned or is leased, some marking is provided within the icon.

The map is one representation of a view of the network. The links associated with the designated sub-network are shown on the map as lines between the offices. A link with spare facilities is represented as a solid grey line while a link without spare facilities is a dotted line.

Figures 8, 9:
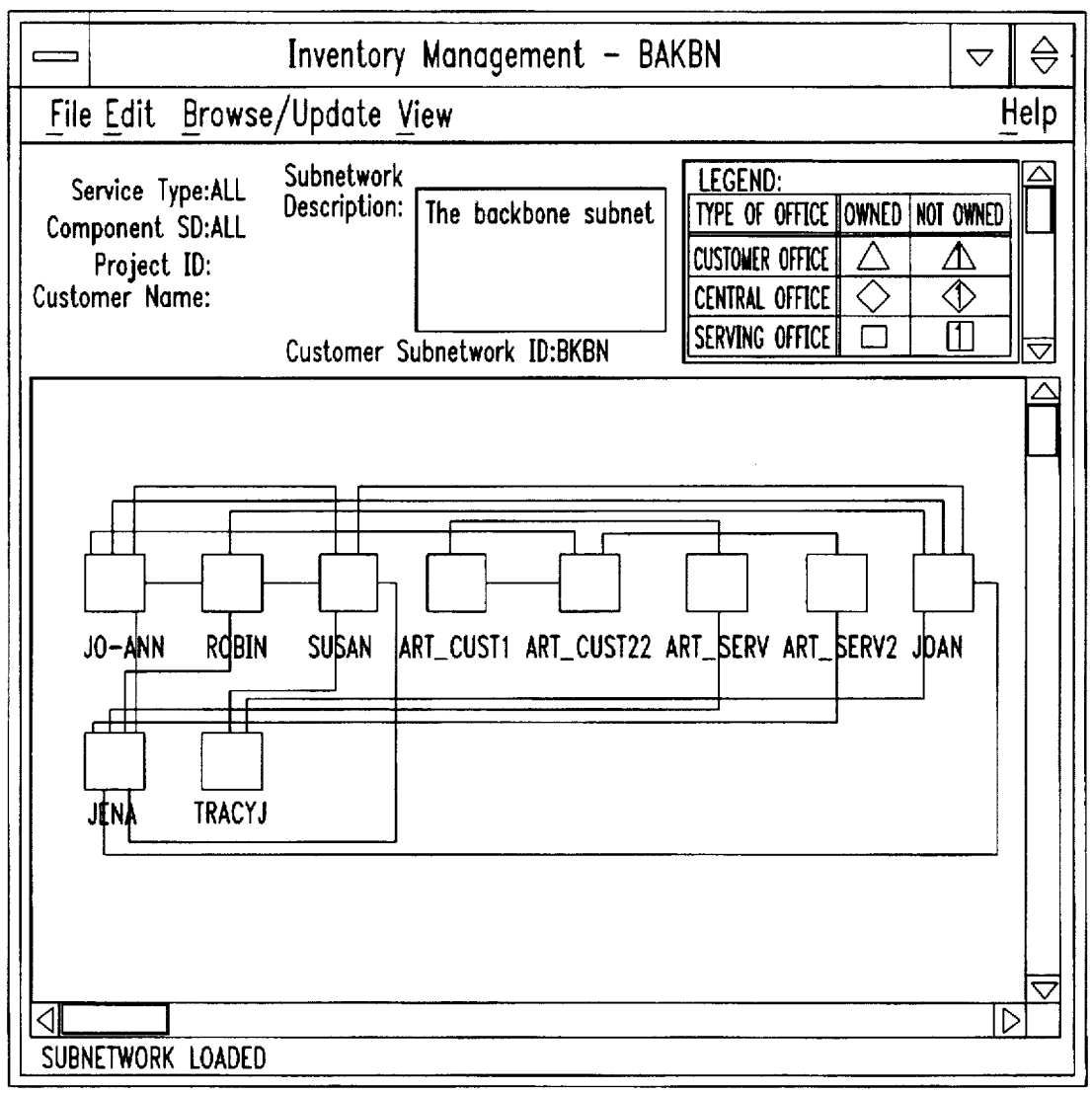

In an alternative presentation of a view of the sub-network, the user can select a component view of the network map as illustrated in FIG. 9. It is also possible to adapt the map presentation with respect to the presentation of office names and the display of spare links rather than all links. All of these are design choices for facilitating the user's comprehension of the network inventory information.

The remainder of this section relating to inventory management will describe, in subsections, various functions which are available to the user as the inventory management capabilities are accessed.

Adding and Deleting Offices

It may be desirable to add a new office to the database; or delete an existing one. This is expected to be an infrequent procedure once the system is up and running. However, it is important to remember that addition and deletion may have serious ramifications. First, as an office is added there will be no equipment associated with the office and all equipment information must then be provided as described subsequently. Similarly, deletion should not be permitted without first deleting all of the equipment stored or installed in the office and the links associated with the office.

A window for inserting the new office is illustrated in FIG. 10. The office can be identified by its name, its location and by its customer information. In the interface example described in this application, the creation of such an office begins by accessing the editing capabilities from the inventory management window, then selecting the "office" option and the option of creating such a new office. Once the office is created it is necessary to provide it with inventory so that it can be used in the network.

Alternatively, an office can be deleted but only if certain conditions are met. The office must have no equipment, it must have no links and it must have no routes. The office can be selected off of the network map and then the edit function of deletion can be activated so long as those conditions are met.

Trunk Groups

The inventory management sub-system provides information on trunk groups between specified locations. A trunk can be assigned to a trunk group in design management operations which are described in detail below. The purpose of a trunk group is two-fold: one for inventory so that the user can see the routes in the network and their characteristics; and the second for switch provisioning as the trunk group is the logical entity that the switch sees and is the entity that most of the switch data relates to.

Figure 11:
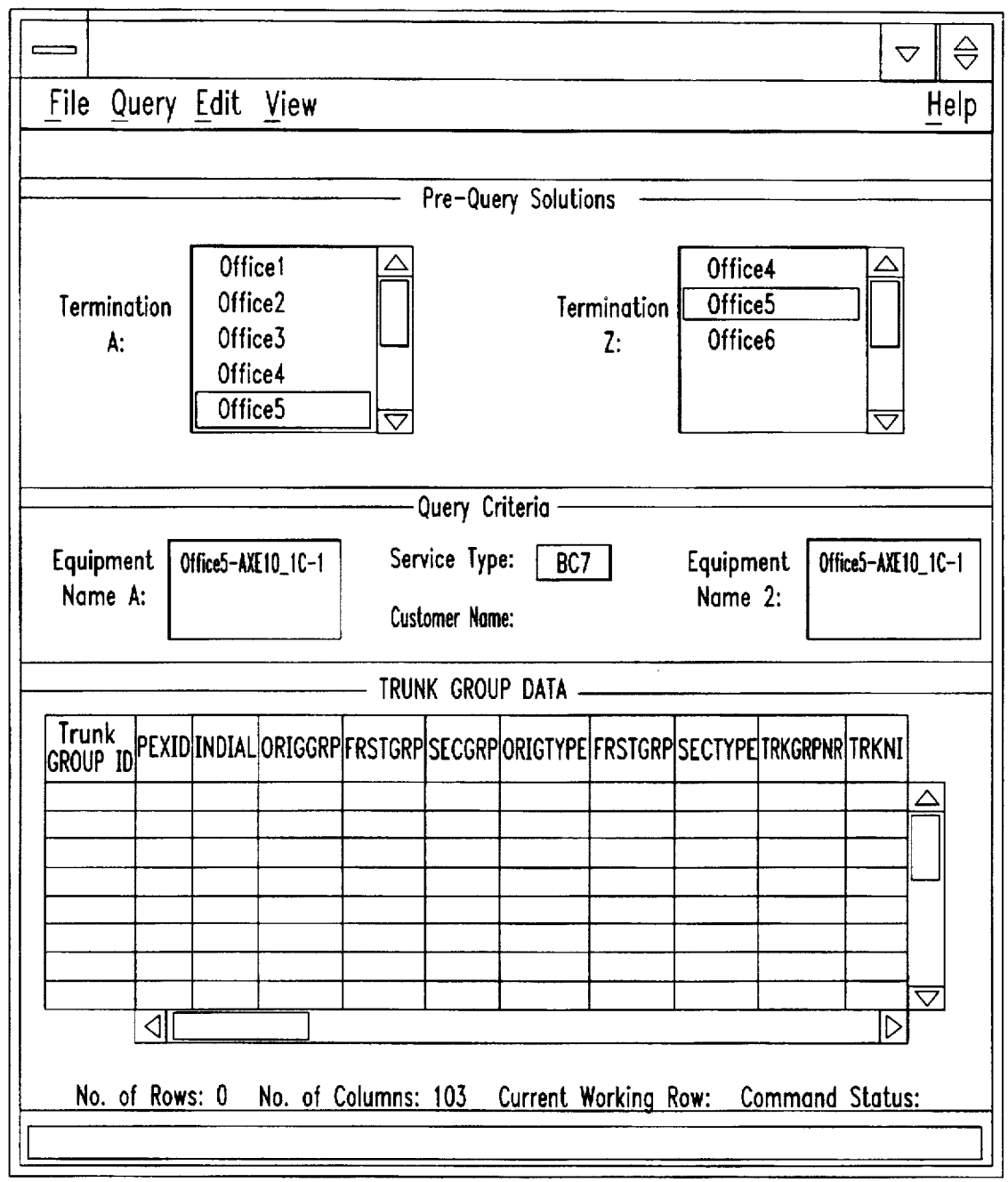

A trunk group is first designated by selecting the two termination offices for the group. First a selection of a location A is made, for instance on the inventory management window and then the second office Z is selected. Then the user can select the trunk group from the browse/update menu of the inventory management window. A browse/update trunk groups window is illustrated in FIG. 11. In accordance with the window, the termination A and the termination Z are selected. Furthermore, the operator selects the equipment name A and equipment name Z. The window then provides trunk group data for each trunk group connecting the highlighted equipment. If the user has been provided with updating authority then information in the various trunk group rows may be modified. Examples of the information provided in the data fields associated with the trunk groups are as follows: trunk group ID—a name to uniquely identify each trunk group; PBXID—the private branch exchange identifier that identifies the PBX to which the group belongs; ORIGGRP—the originating PBX line or subscriber trunk group identity used for originating traffic only. These are samples of the information that can be provided with respect to the various trunk groups and additional information may be provided in the trunk group fields.

The updating capability provided to certain user groups allows not only modification to existing trunk group information but also permits the creation and deletion of trunk groups. However, trunks will not be assigned to the trunk groups or deleted from the trunk groups until the design management operation is performed as described below. This creation and deletion capability with respect to trunk groups merely provides the user with the possibility of assigning to or deleting from such groups the trunks in accordance with the functionality provided in the design management operations.

Equipment Data

The inventory management portion of the system also permits the browsing and updating of equipment. This provides information equipment complexes, units, slots or receptacles, plug-ins and ports for selected office.

As a preliminary matter the user must select an office and then must select the equipment option on the browse/update menu provided with the inventory management window of FIG. 7. An example of the browse/update equipment window is illustrated in FIG. 12. The sub-network ID and the office ID are automatically displayed. The user can then enter more specific information with regard to the type of equipment of interest, either equipment complexes or plug-ins. If equipment complexes are selected then the user needs to select an equipment type, such as a 5ESS2, from the equipment complex type list. Alternatively, if the user wishes to view the information regarding plug-ins then the user must subsequently select an option from the plug-in equipment availability field. The equipment data field is then populated to provide a description of the equipment data. Information in the equipment type and equipment ID fields cannot be edited. However, other ones of the displayed fields may be edited, such as the fields relating to serial number, equipment location and plug-in ID, plug-in name. Users are able to view the name of the link that is tied to a particular port and the link information associated to the ports of any particular equipment.

In addition to updating equipment data it is possible to also add equipment to the location and to assign a physical address for equipment when the equipment complex is created.

In a similar manner plug-in data can also be either browsed or updated. In this circumstance the plug-in option is selected under equipment and the appropriate selection is made under plug-in equipment availability. Then changes can be made to the plug-in data table such as with respect to the serial number for such equipment and such other information as thus related information (e.g., fixed capital costs, fixed maintenance costs, and monthly recurring costs).

Once information regarding the lowest equipment level in the browse/update equipment window has been accessed it is also possible to view port information and to cable links to available ports. A browse/update ports window is illustrated in FIG. 13. When only browsing is permitted the user can view port information for an office. However, if updating capabilities are also provided then the user can cable links to available ports and assign a port to another sub-network provided the user is the owner of that other sub-network. The system provides for access to different types of cabling information such as carrier and external cabling links; internal cabling links; internal links and aggregate links. The inventory management system together with the graphical user interface facilitates the management of port ownership and the cabling of links.

Equipment Location Data

The inventory management system also provides the capability of browsing or updating equipment physical addresses. It provides the capability of selecting an office and then a room, row, bay, shelf or shelf position or any installed equipment. Equipment physical addresses should be created before the equipment is created. Once the equipment is created in the previously described equipment window, the physical address data is provided in the equipment location field. FIG. 14 illustrates a sample browse/update equipment location window. This window permits the user to create the full location hierarchy at which various equipment can then subsequently be located through use of the equipment window referred to above with respect to FIG. 12. The user can create the appropriate rows, bays, shelves and shelf positions for the equipment location table.

Back-to-Back Routing Data

Figure 15:
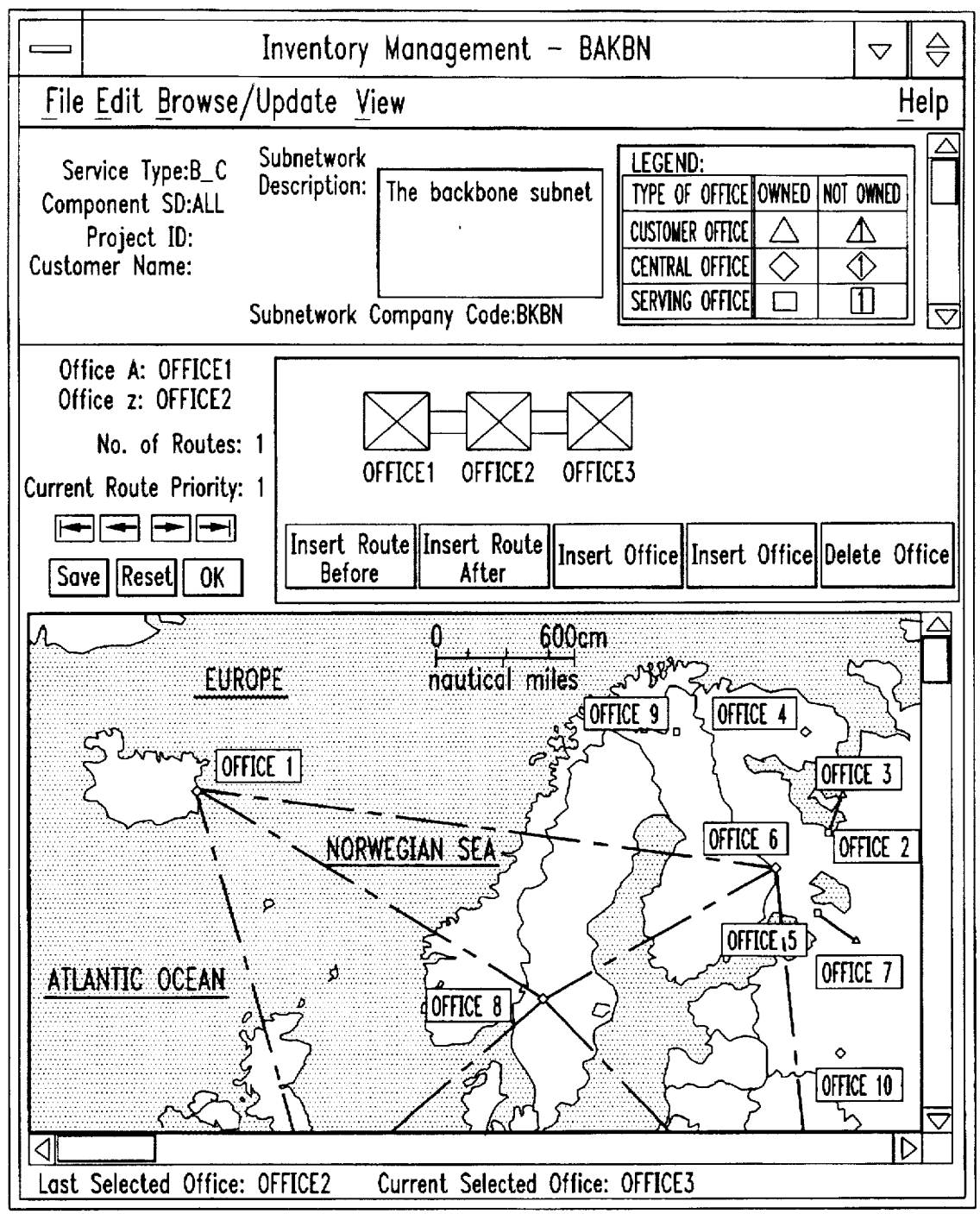

Back-to-back routing is a feature that allows the user to predefine the routes for a particular service type. For example, if fiber is needed to design a circuit then the service would be routed through one or more intermediate offices. The information management capability permits the creation of more than one back-to-back routes. However, once the design management capability is entered only the route having the highest priority effects the service that is being designed. A sample back-to-back window is illustrated in FIG. 15. The window provides a display that indicates how many routes are available between a first office, Office A and a second office, Office Z. Then it will also display the route and indicate that route's priority among all of the available routes. The user can create a plurality of routes between the two offices and can assign each route a priority amongst all of the available routes. The routing priority determines the order in which the route is selected for the link.

Links

The inventory management system provides information about links that have been created with the design process in the design management sub-system as well as cabling links created in the inventory management sub-system. The browse/update link window permits the browsing of links or the assignment of a component link to a different network as well as a change of some information on unassigned component links. However, this window does not permit the creation of new links. A sample browse/update link window is illustrated in FIG. 16. The user can select the service type, the equipment type and the trunk group. It is also possible to change some values in the fields in the service-based attributes depending on the equipment type chosen and how the equipment profiles and rules were installed in the database. Thus, such information such as line format, frame format, link usage, signaling type, urgency of restoration et al. can be treated in this browse/update link window.

Projects

Figure 17:

The inventory management system also permits the addition or deletion of a project and the change of project properties. This is all done by the operations available in a browse/update project window such as that illustrated in FIG. 17. In a browse mode the window allows the user to view project information in the database. In an updating mode the window permits a user to modify project description information and permits the addition of projects to the database.

Customers

The inventory management sub-system also permits the user to view and modify data about customers. This information is accessible through a customer window in which the user may browse customer information or may update such customer data as a customer's billing address, a customer's contact name, a contact phone number et al. The customer window also permits the addition of a customer or a deletion of a customer in a manner logically consistent with the earlier descriptions of additions and deletions controlled by the other windows available in the inventory management sub-system.

Offices

In the beginning of the description of the inventory management sub-system the insertion of new offices was described. The sub-system also permits the user to view properties of a network office and to add an office to another sub-network. In one available functionality a user may seek to add an office to another sub-network where the office may want to lease ports from the owner's sub-network. The borrower's sub-network must then add the office to its sub-network in order to see the desired equipment. This functionality is available under the browse/update offices window in the inventory management sub-system.

Conclusion

The inventory management sub-system provides exceptionally flexible data browsing and updating capabilities with respect to all manner of inventory information related to a telecommunications network management function. Various graphical interfaces such as those shown in the drawing figures can be provided to facilitate the navigation of this inventory management sub-system. The user group information can be utilized to define the exact capabilities that a given user may have for either browsing or updating in the inventory management sub-system.

B. Design Management Sub-System

The design management component of the present invention provides both order management and design capabilities. The order management portion of the design management sub-system provides for the following features: a) the creation of New Connect, Change, Records, Supplement, Engineering and Disconnect orders; b) assign order to users automatically and reassigning orders to other users; c) setting pre-defined critical objective dates; d) alerting users to jeopardy conditions; e) managing activities and dependencies between activities; f) canceling an order with a single click; g) querying the database and listing existing orders; and h) printing work order record documents.

The design management aspect of this sub-system provides for the following functionality: a) automatically generating CCITT or common language link identification; b) the ability to insert network offices and view routing alternatives on a network map; c) the ability to query and "zoom" link capacity based on link properties, equipment properties and link status, restriction and availability; d) automated link design and assignment between two points in the network; e) assigning and releasing offices, component links and plug-ins; f) verifying design continuity; g) displaying link and equipment properties; h) entering cost related data on aggregate links; i) automatically completing designs and generating attributes; j) managing component assignment relationships. The first part of this section will discuss the order management functionality of the system and the second part of this section will discuss the designing capabilities.

1. Order Management

Figure 18:
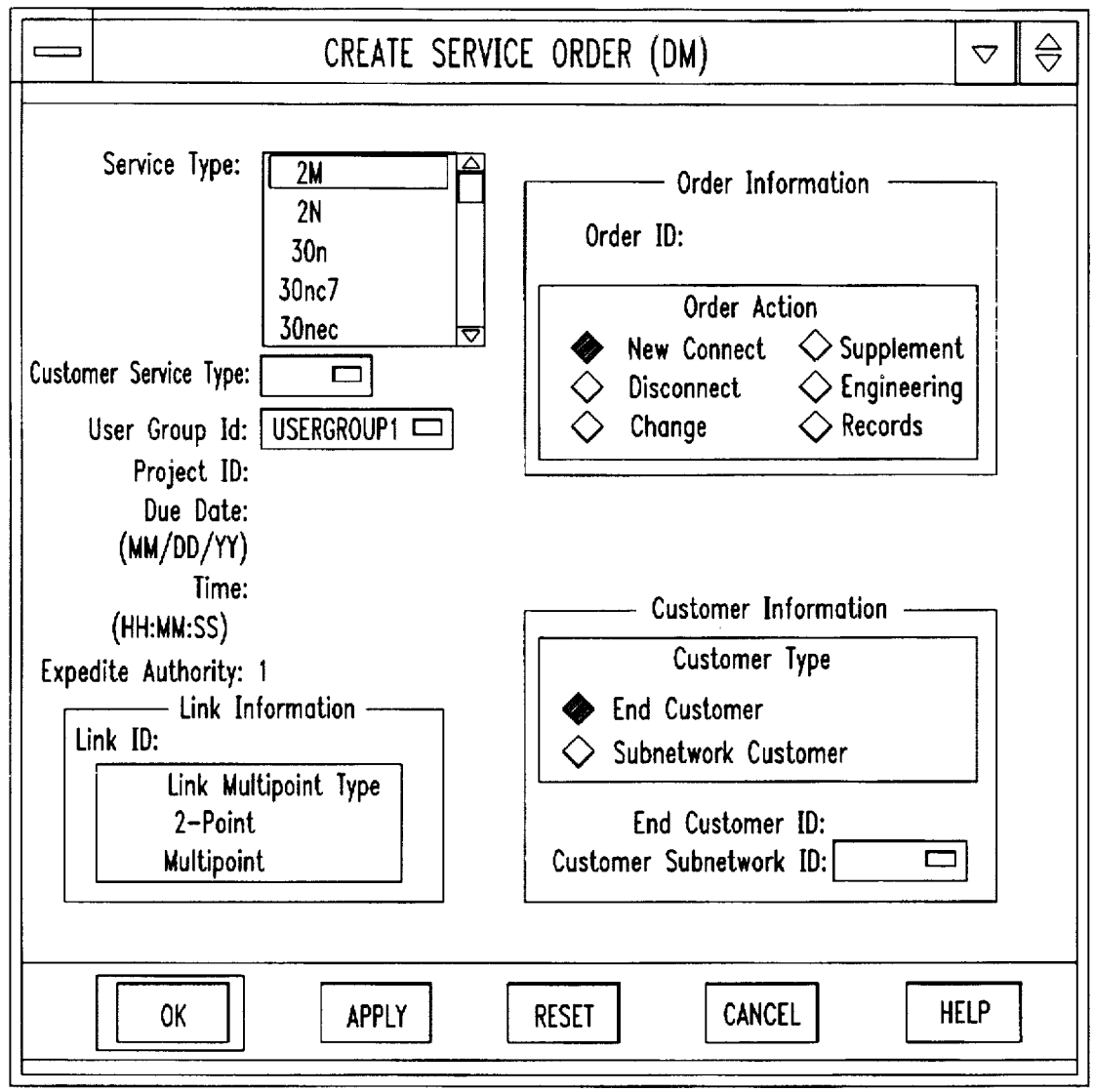

The ordering capabilities can be divided into three categories: entering new order information; supplementing orders; and providing change orders, records and engineering orders. Once the design management window is selected from the main menu it is possible to create a service order. An example of a window directed to creating a service order is shown in FIG. 18. This window is an illustration of a window that allows the user to create a new order and to begin the end to end design. This window can be used for defining New Connects, Disconnects, Changes, Supplements, Engineering Changes and Records Changes.

In the New Connect procedure it is necessary for the user to enter information about customers and their service requirements. First, an order is created. Then certain data and additional information relating to the order are submitted to the database. For instance, service order data and termination data can be provided in connection with the order. In addition, the user specifies critical dates for completing the order as well as defines any particular order entry activities that are necessary for the completion of the order. As can be seen from the sample window in FIG. 18 the user group information must be entered. The user group defines the capability for the user to perform certain order creation capabilities. Once the appropriate information for creating the service order is entered into the requisite fields of the window of FIG. 18 it is then possible to proceed to the process for entering service order data. This is done by first accessing the design management window FIG. 19 from the main menu. The user can then select the functionality of entering order data which will lead to a new service order data window shown in FIG. 20. This window permits the user to enter detailed order-related information into the database in support of the end-to-end design process. It is divided into six panels: customer order specifications; trunk group information; customer inforamtion; requisitioner information; order administrator inforamtion; and remarks.

Once the service order data is entered it is necessary to provide termination data for both termination points (A & Z) of a link. The termination data windows can be also accessed from the design management main window by selecting an icon representative of the appropriate termination. An example of a window for entering termination data is illustrated in FIG. 21. The window permits the user to enter data concerning the properties of determining points of a link as described in an order. These windows are used only in the New Connect procedure. The important information to be provided relates to customer information with respect to determinations, transmission levels for the terminations, characteristics and additional remarks.

Having defined these features, it may be appropriate to supply information about critical dates or milestones in connection with the order. This is done by accessing an update order activities window from the design management window. An example of such an update order activities window is illustrated in FIG. 22. This window permits the user to enter critical interval information to support the end-to-end design process. An activity information table displays information on jeopardy conditions and whether or not dependent orders exist for each activity. Command buttons can be provided in association with the window to permit the user to manage information for a selected activity. For example, it may be appropriate to provide command functions such as "complete" to complete the activity, "reassign" to reassign the activity to another user, manage the details about dependencies or enter notes about the activities. This activities window then provides information about the order including the order ID, the version number, the due date and so forth. Information can be edited in these windows in a manner similar to that which we have described before.

The first phase of the new connect procedures is finished when the order entry activities are completed, i.e., when all of the activities defined for the order up to but not including the design link activity are completed. When all order entry activities have been completed it is possible to duplicate orders so as to copy an order for which you have been working. For example, if you are adding thirty new trunk groups between two switch points, you can make 29 copies of the original order rather than manually create a new order for each individual trunk group. A duplicate order window (not shown) can be displayed automatically when the last order entry activity is completed and allows you to make one or more copies of the completed order.

Having completed the description of the new connect procedure it is appropriate to consider the related procedures for performing change orders, record changes, engineering orders and supplements.

A change order procedure is very similar to a New Connect procedure in that it has three basic phases, namely entering order information, redesigning the link and finalizing the link service. Engineering orders are very similar to change orders except that the creator of the order is different, i.e., the change order is usually initiated by a customer and may have costs associated with it for billing purposes while an engineering order is initiated by the developer or engineer. A records order is a change to administrative information that does not effect the design, thus the records order may deal with the entering of order information or the finalizing of a link for service but does not relate at all to redesigning the link. Thus, these three activities, change orders, records and engineering orders have substantial overlap with one another.

The entering of order information and the finalizing of a link for service really relates to the type of information that may be provided in connection with a modification of order forms previously created such as modifying such information as the critical dates associated with the order. The more complicated task regards the redesigning of a link which is possible in a change order but not a records change. The redesign of a link may require the insertion of offices, the querying of the database and the signing facilities, the releasing of offices or the releasing of links. The redesigned process is better understood in reference to the design process which is described in the subsections that follow.

In view of the flexibility of the database management provided by the present invention the user can access various orders created by the use of the order management portion of the design management subsystem and in turn, may create analogous change orders, record orders or engineering orders.

In addition to such abilities to modify or request changes to orders, the present invention provides a capability of performing order supplements. A supplement is an addition to an existing order that is not yet service-ready. Order supplements are most likely to be administrative changes, but also can be design changes. As in connection with the change orders described above and the new connect procedures, the procedure for a supplement has three basic phases, namely entering order information, redesigning the link and finalizing the link. Instead of creating a new connect order one creates a supplement order. This supplement order then provides the capability of entering further service order information or revising any objected dates as necessary.

Thus, the order supplements are somewhat similar to the other capabilities which are provided by the database in the flexibility afforded the user for maintaining and modifying order information. Performing supplements also includes the capability of redesigning links. But, as discussed above, design aspects will be referred to in the subsection that follows.

It is clear from this discussion that the information system of the present invention provides the user with a capability of order management which deals with certain ordering issues such as creating new orders, modifying the existing orders, creating change orders or order supplements, and even creating engineering orders. Thus, the order management which is uniquely tied to the design management subsystem of the present invention provides a critical ingredient to the integrated database configuration for network management.

2. Design Management

The design management subsystem provides the user with certain design capabilities such as designing links, defining offices and back-to-back routings, assigning plug-ins, browsing and viewing various link properties, performing disconnects of links and also certain supplemental functionality related to design management.

Figure 19:
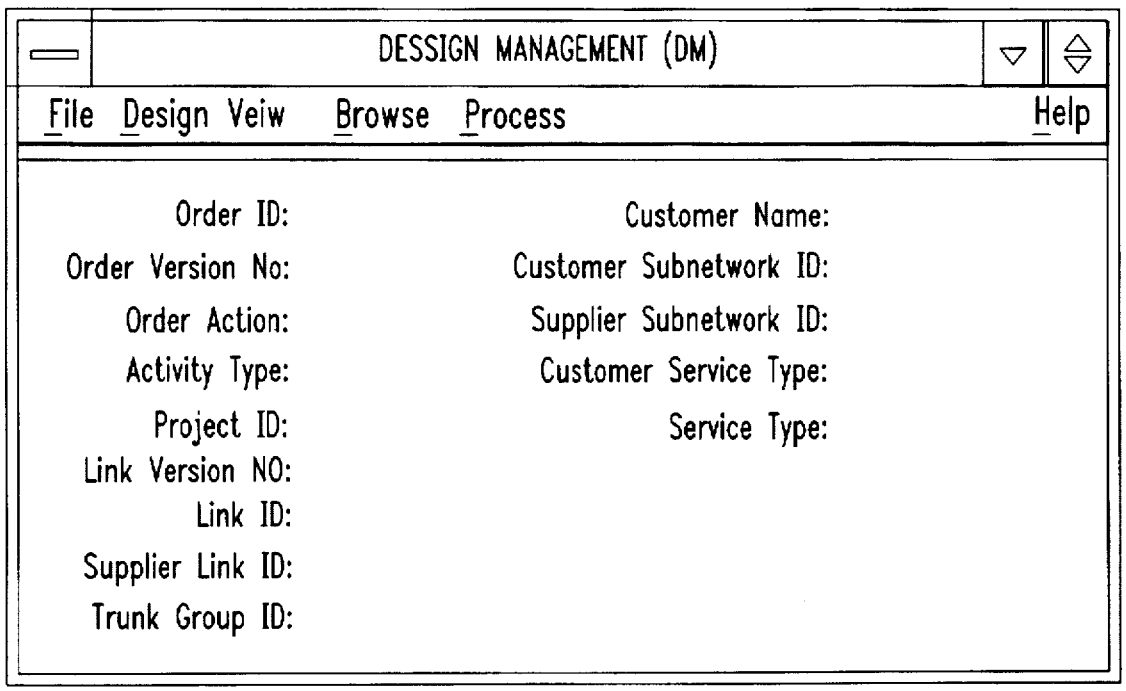

The design management window shown in FIG. 19 is accessed as the design function is desired by the user. This is the primary window for the design management subsystem and displays a summary of current order information including the current activity type. The window allows the user to perform procedures associated with an order. All procedures begin from this window.

From the design management window the user can select the functionality of browsing a service order. The user can be provided with the browse function in connection with another window, an example of which is illustrated in FIG. 23. This browse service order window allows the user to specify criteria and query the database for existing orders. Orders meeting query criteria are displayed in the service order data panel. This window also allows the user to select an order in the service order data panel and to open or cancel that order.

Having looked at the order, it is possible to actually design the link. This functionality can be performed in connection with the new connect procedure. Designing a link is a complex process that can involve several iterations if an aggregate link includes a number of component links. The link design process consists of the following tasks: assigning links between offices (inter-office links); assigning links in an office (intra-office links); verifying the link design; and completing the design activity. There are tasks related to performing these four basic tasks. These related tasks include inserting or releasing offices as necessary, reversing or flipping an office orientation, assigning plug-ins, and viewing equipment and link properties. In the design window office objects representing termination points are shown as dummy links. Inter-office links between two termination points can be done by manual assignment or by an auto-select/assignment. Thus, the user can either specifically manually design the inter-office links or under the appropriate conditions can allow the system to auto-select and decide links. The need for manual inter-office link assignment arises particularly where facilities between two termination points are not available in your original design. Thus, an alternative link must be constructed.

The design management window shown as an example in FIG. 19 allows the user to assign, change or view component and aggregate links for the current order. It also provides access to additional windows that allow the user to view properties of the displayed links and equipment. In the examples shown, links within Office 1 are illustrated.

A link list query window, shown in FIG. 24 allows the user to query the database for component links and to select and assign links based upon the query. The window also provides access to additional windows that allow further assignment or a search for information.

Figure 25:
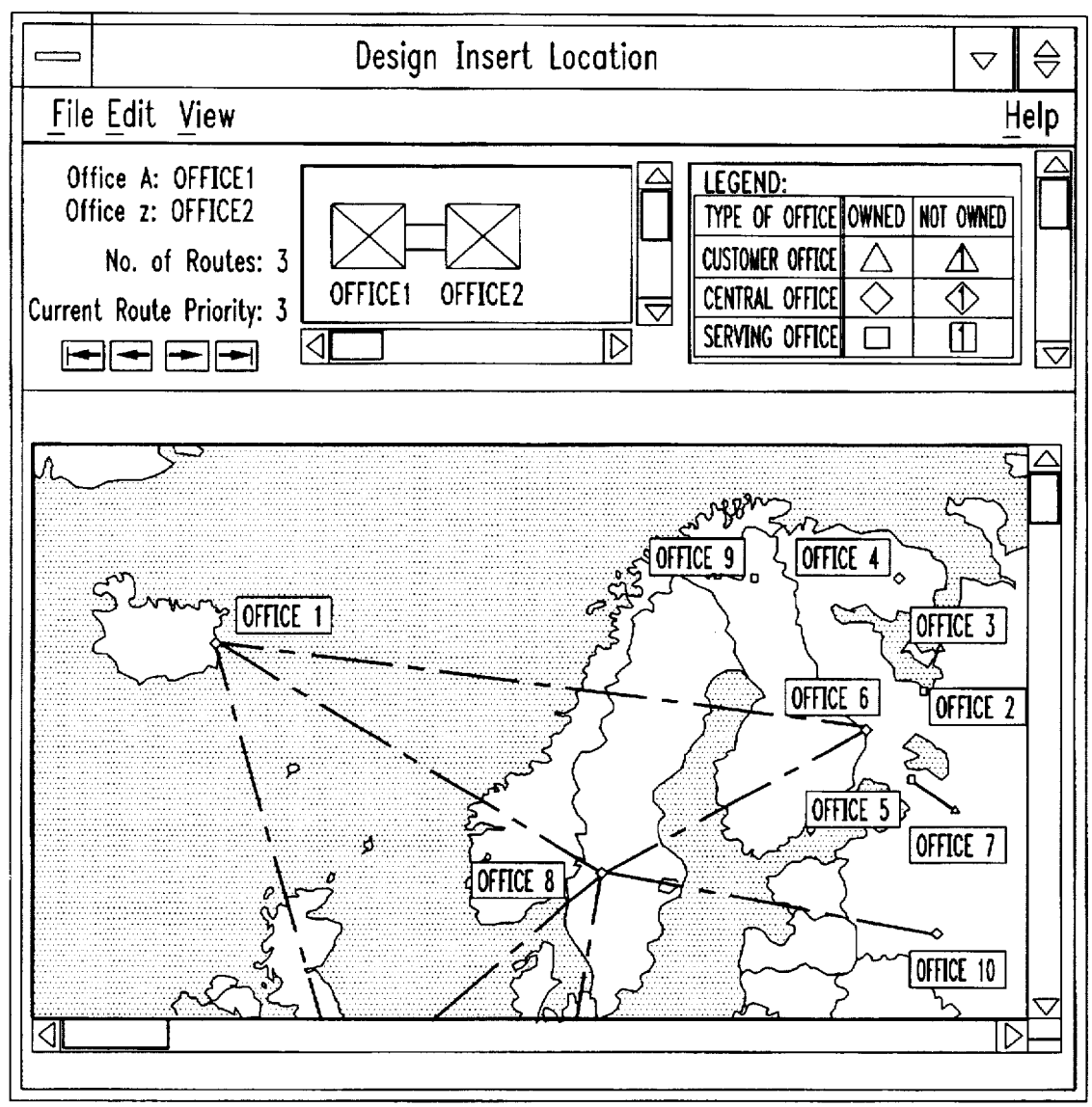

As mentioned above, it may be necessary to insert an office (component link) if no direct link exists between two offices (terminations) so as to complete an aggregate link. This is possible by executing back-to-back routing in conjunction with an insert location window such as shown in FIG. 25. In this figure the bottom panel displays the location maps of the subnet-work in the design and graphical objects for the two termination points in the design appear in the sub-window. The graphical objects in the panel reflect the priority routing created in the inventory management sub-system. If additional offices were added to the route and inventory management graphical objects for these offices are also displayed. The back-to-back routing sub-window permits the user to insert intermediate offices inserted between two termination points.

Figure 26:
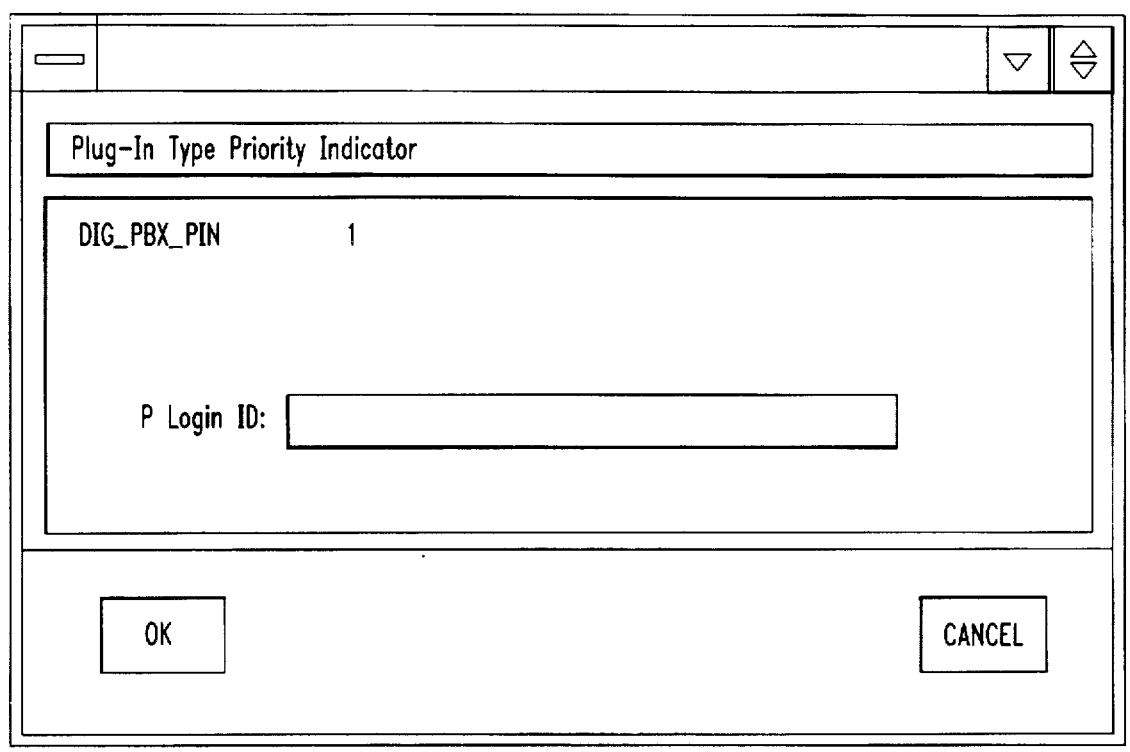

Likewise, it is possible that under certain circumstances where the user attempts to add an office it is determined that a different office should have been inserted. Thus, the system provides flexibility for adapting to this problem by permitting the release of a previously designed office. The office is released after all of the links and equipment associated with that office have been released. The design management sub-system is further provided with the capability of performing other assignments and the viewing of other design information. In particular, the user can assign plug-ins if the equipment complex in the design does not include preassigned plug-ins. A plug-in assignment window such as that shown in FIG. 26 can permit the user to assign spare plug-ins to slots in the equipment complex. This again enhances the designing capabilities of the overall system.

Similarly, the design management sub-system permits the viewing of equipment and link properties after links and equipments have been assigned. This includes viewing equipment properties and aggregate link properties such as assigned time slots or properties of the aggregate link.

Finally, once the design activity has been completed it is possible to generate a work order work document. The work order document summarizes the information in the order.

Just as the design management capabilities permit the design of the links, and the creation of new connects, the sub-system also provides the capability of executing a disconnect procedure that can be performed only on orders that have already been put into effect. The disconnect procedure has two basic phases, namely entering order information and removing the link from service. The entering of order information is very similar to the operations with respect to the entering of an order for a new connect or change order. You simply create a disconnect order rather than a new connect or change order. The second phase, removing the link from the service, is the same as that in connection with the building of connects where once the order entry activities have been completed a work order record document related to the removal of the link can be generated and the remaining activities can be subsequently executed. Once the word is received that all work related to an activity has been done the activity can be indicated as complete in the update order activities window.

In addition to the above described management functionality, the present invention also provides additional design management features. In particular, in accordance with the arrangement of the present invention, the user can browse an order, can open order, can cancel an order, can manage dependency information, can reassign an activity and can manage activity details and notes. Again, all of these features are merely extensions of basic activities which are available through the organization of the database and the operation of the design management sub-system. They enhance the user's capability of providing and accessing design information which can be used to create and/or maintain the required network communication configuration.

C. Conclusion

The above description sets forth an indication of the basic functionality and the relationship between that functionality in connection with providing the SDI telecommunications network management system. This system is based on a client-server architecture in which a central server is accessed from the client workstations through a local area network. Additional work group servers and their networked client work stations can remotely access the central server.

Figure 27:
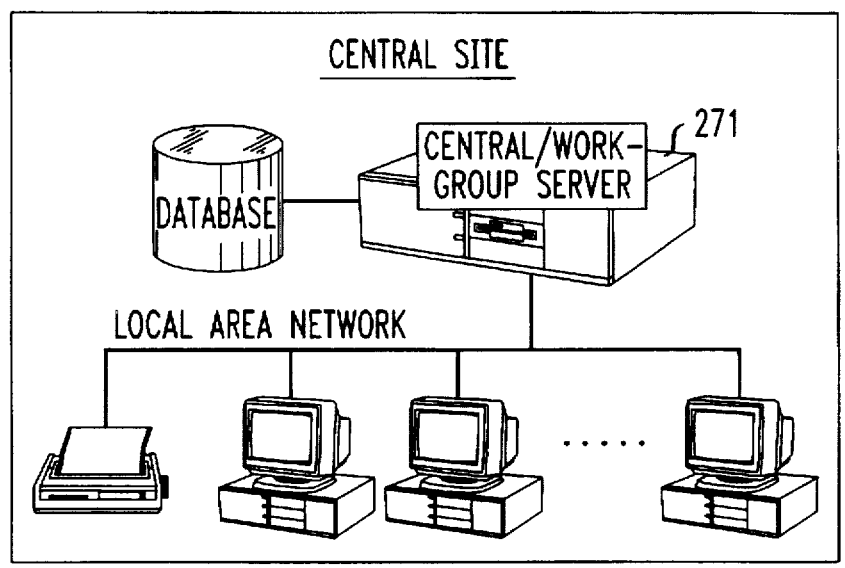
FIG. 27 illustrates a first arrangement of a system for implementing the present invention.
Figure 28:
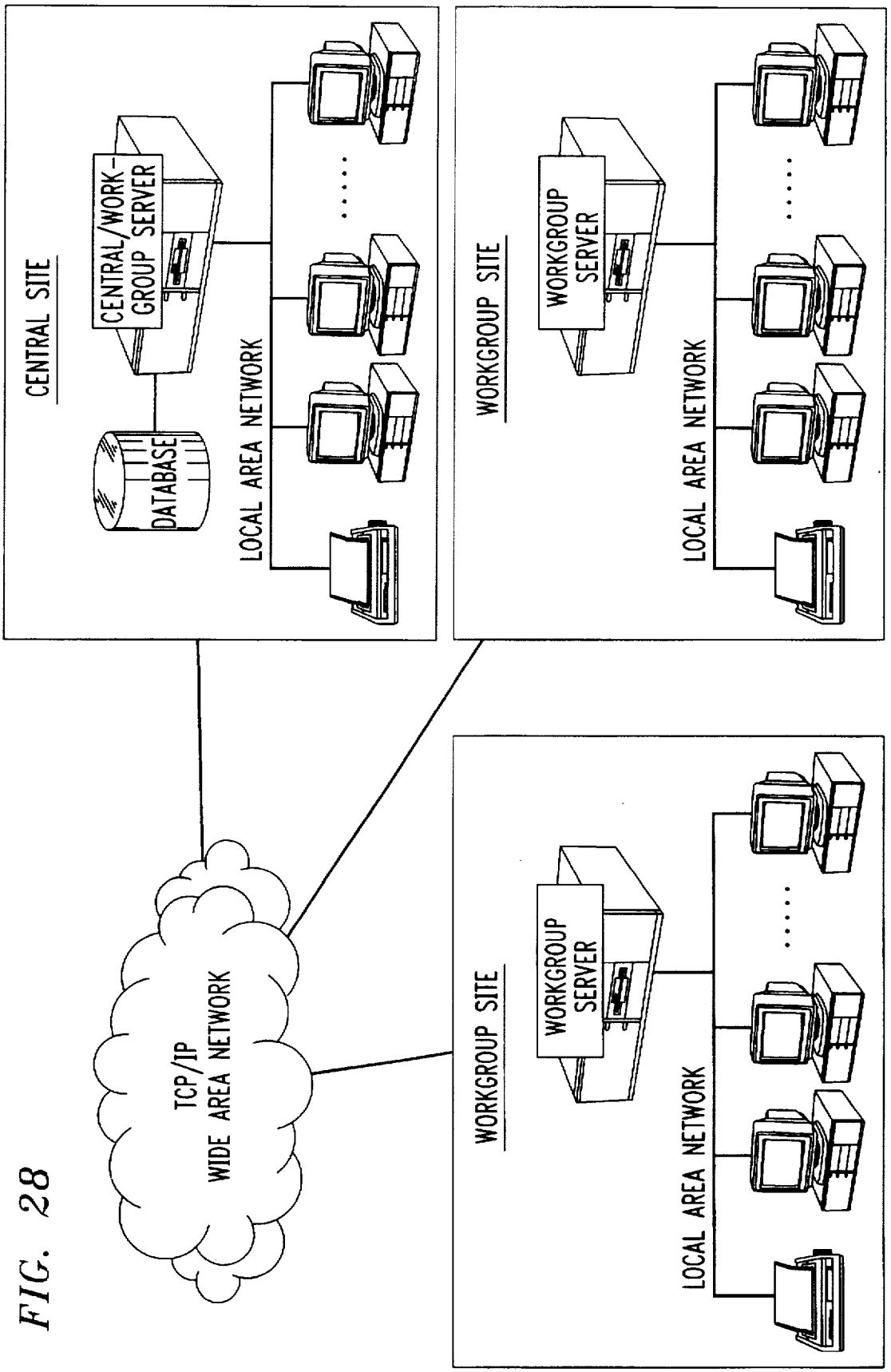
FIG. 28 illustrates a second arrangement of a system for implementing the present invention.
Figure 29:
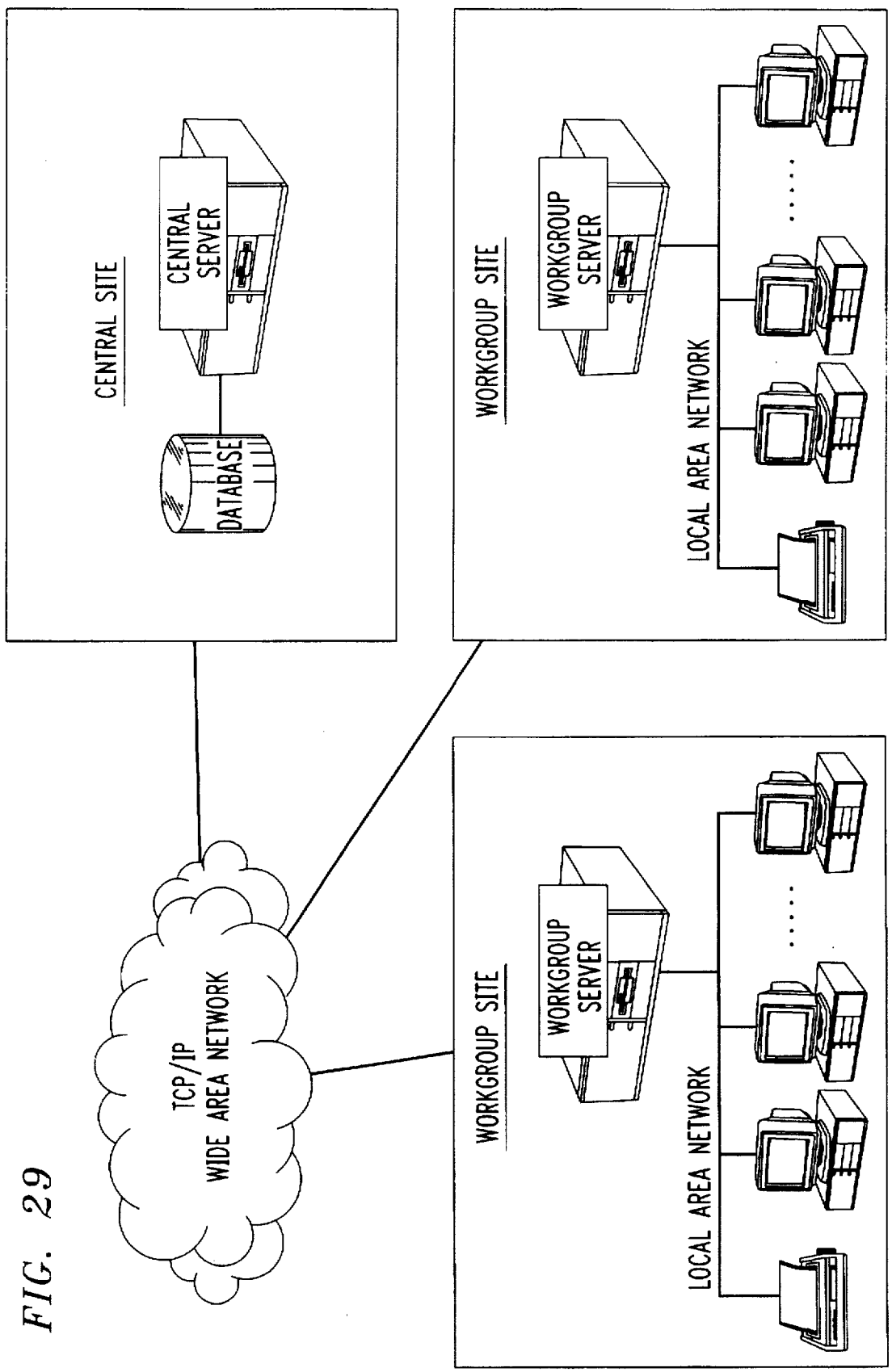
FIG. 29 illustrates a third arrangement of a system for implementing the present invention.

There are three different possible configurations of the client server architecture. The three configurations of SDI high level architecture are shown in FIGS. 27 to 29. FIG. 27 shows a stand alone configuration where there is only one site. In this configuration a central server 271 doubles as a local/work group server and is coupled to a local area network and database. In FIG. 28 and SDI installation has a central/work group server with remote work group servers in a wide area network. For instance, the central site may include a local area network with a plurality of users, a central/work group server and a database. This central site can be connected by a wide area network with two different work group sited which include work group servers connected to users over a local area network.

In an alterative configuration the central site has the central server only and does not double as a work group server. The central site is connected to the work group sites through the wide area network as illustrated in FIG. 30.

Each server and its logically connected clients is referred to as a site. The server at each site is referred to as the local server. Each server contains the binary files and local log files to support the workstations in its site. The server in the central site also serves as the database server for all of the workstations in both the central and remote sites.

The central server in accordance with one embodiment of the invention contains Oracle software and the SDI database. All of the SDI software is installed on the file servers and certain directories are remotely mounted on the local client workstations. Most of the SDI system administrative tasks such as installation, back-up and recovery are done from the central server. The choice of hardware for the central server depends on the size of the database and the number of clients. Examples of potential central servers are the HP9000-T500 corporate business server or the HP9000/800 G50.

Each work group server contains the binary files and log files to support the workstations at each site. The work group servers may be any one of the following: HP9000/800 series; HP9000/800 835 series; and/or HP9000/712/80i.

The clients have other workstations on which the SDI application is run. SDI software is remotely mounted on the client workstations from the local server. The SDI user interface and the rest of the SDI processing is done on the client workstations. Only database activities are directed to the central server from the remote site. When the SDI software is run on an HP9000 series 700 workstation the workstation can act as both the server and the client. Work group servers however, are file servers only and do not contain the database. Clients are normally any of the variety of HP9000/700 workstations. The recommended models are HP9000/712/60 and HP9000/712/80i.

Much of the application functionality within the network design and network inventory management modules SDI revolves around the management of this highly interrelated network information. including tools supporting network office and bay installation, installation and cabling of equipment and facilities, and circuit design and assembly.

SDI also serves as the application interface to the service management and element management layers of the TMN. The SDI order management module controls the acceptance and processing of requests for changes in the network originating from planning organizations, as well as customer service organizations. After a request has been processed in the network management layer (for example, a circuit has been designed and assembled), SDI will then communicate the design information to the element management layer to support physical implementation of the design against the appropriate pysical network elements. The SDI gateway module supports these types of interfaces to upstream and downstream applications, as well as interfaces to applications in the network management layer for portions of the network that may not be controlled and inventories via the SDI application.

As indicated above, the fact that the database is a relational, attribute-based database is important to the ability for the system to provide the flexibility that it does in tying together the design management and inventory management functions. The definition of generalized, attribute-based object classes in SDI enables the same code to be applied to a wide range of user scenarios. These generalized object classes are specialized via the instantiation of attributes retrieved from user populated rule tables. Thus, not only is the same code reused, but the operation of the system can be configured by the user without additional code development. This arrangement reduces the time and expenditure necessary to customize SDI to meet application requirements. thereby reducing the time and cost required to introduce new technologies, services and user-defined processes and permissions.

The adaptability of the object-oriented attribute and rule-based software has many user advantages in today's competitive and rapidly evolving telecommunications environment. In the disclosed embodiment it provides the capability of tying together design and inventory functions in computer implemented software in a manner which was not suggested in any of the prior art systems in which these functions were maintained as being related to separate and distinct databases.

What is claimed is:

1. A system for providing efficient management of network resources comprising:
   workstation;
   a central server; and
   a network connecting said workstation and said central server;
   wherein said central server includes,
     a telecommunication network order management subsystem;
     a subsystem for inventory management of components for a telecommunication network; and
     a subsystem for design management of a telecommunication network.

2. The system of claim 1 wherein said central server includes an attribute designed database wherein each subsystem is based on an attribute-based design.

3. The system of claim 1 wherein user accessibility to one of said subsystems is defined by a user group identification code.

4. The system of claim 1 wherein said workstation displays a graphical user interface facilitating access to said subsystems.

5. The system of claim 1 wherein said inventory management subsystem comprises means for tracking of the use and availability of telecommunication network components.

6. The system of claim 1 wherein said order management subsystem comprises means for tracking orders for telecommunication facilities.

7. The system of claim 6 wherein said order management subsystem further comprises means for scheduling activities related to completion of orders.

8. The system of claim 1 wherein said design management subsystem comprises means for creating a telecommunication network design.

9. The system of claim 8 wherein said design management subsystem further comprises means for automatically provisioning inventory to satisfy an order request.

10. A system for efficient use of resources of a telecommunication network comprising:
    a first plurality of workstations;
    a first local area network coupling said first plurality of workstations;
    a central server; and
    a wide area network coupling said first local area network to said central server;
    wherein said central server includes,
      a telecommunications network order management subsystem,
      a subsystem for inventory management of a telecommunication network, and
      a subsystem for design management for a telecommunication network.

11. The system of claim 10 wherein said central server includes an attribute designed database wherein each subsystem is based on an attribute-base design.

12. The system of claim 10 wherein user accessibility to one of said subsystems is defined by a user group identification code.

13. The system of claim 10 wherein said workstation displays a graphical user interface facilitating access to said subsystems.

14. The system of claim 10 wherein said inventory management subsystem comprises means for tracking of the use and availability of telecommunication network components.

15. The system of claim 10 wherein said order management subsystem comprises means for tracking orders for telecommunication facilities.

16. The system of claim 10 wherein said design management subsystem comprises means for creating a telecommunication network design.

17. The system of claim 16 wherein said design management subsystem further comprises means for automatically provisioning inventory to satisfy an order request.

18. A system for efficient use of resources of a telecommunication network comprising:
    a first plurality of workstations;
    a first local area network coupling said first plurality of workstations;
    a central server wherein said central server comprises;
      an order management subsystem,
      an inventory management subsystem, and a design management subsystem a wide area network coupling said first local area network to said central server;

a second plurality of workstations; and a second local area network coupling said second plurality of workstations, wherein said wide area network couples said second local area network to said central server.

19. The system of claim 18 further comprising a third plurality of workstations and a third local area network coupling said third plurality of workstations and wherein said third local area network further couples said third plurality of workstations to said central server.

20. A method for providing an adaptable system that provides efficient management of network resources the method comprising the steps of:

defining a plurality of generic attribute classes;

associating network features with specific attribute values based on said defined plurality of generic attribute classes; and integrating the associated specific attribute values with a central server adapted to provide a plurality of management subsystems.

21. The method of claim 20 wherein said plurality of generic attribute classes are defined by a generic code, wherein said attribute values are determined by a first set of user defined data rules; and wherein the combination of said generic code and said attribute values yields a database suitable to manage a first-type network.

22. The method of claim 21 wherein a second set of attribute values are determined by a second set of user defined data rules and wherein the combination of said generic code and said second set of attributable values yields a database suitable to manage a second-type network.

* * * * *